July 21 1925.
N. SEAGREN
CORD OR ROPE HOLDER
Filed Nov. 28, 1924
1,546,798
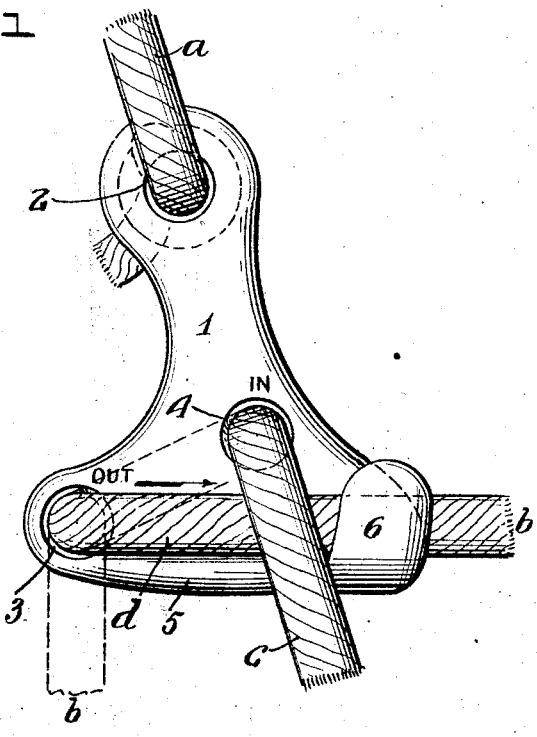
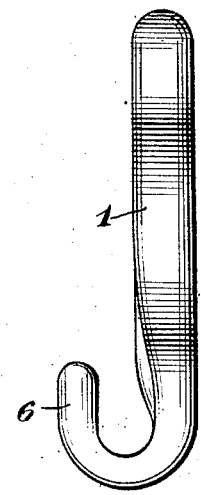
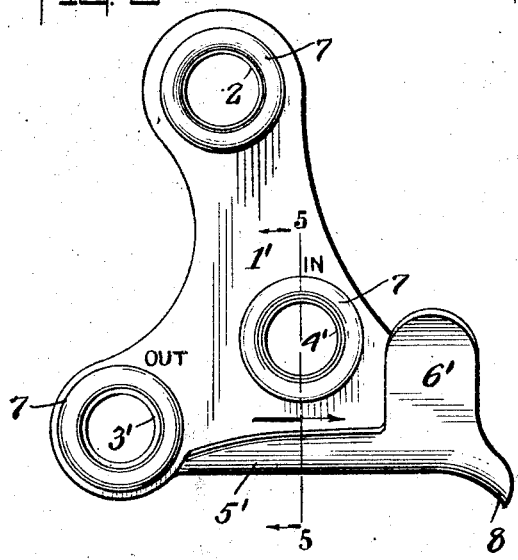
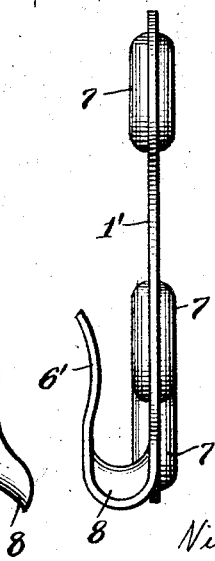
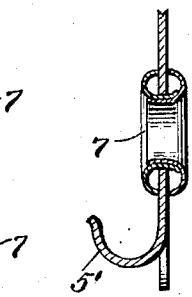
Nils Seagren
INVENTOR
BY Robert B. Killgore
ATTORNEY Patented July 21, 1925.

1,546,798

UNITED STATES PATENT OFFICE.

NILS SEAGREN, OF BROOKLYN, NEW YORK.

CORD OR ROPE HOLDER.

Application filed November 28, 1924. Serial No. 752,796.

*To all whom it may concern:*

Be it known that I, NILS SEAGREN, a citizen of the United States, residing at the borough of Brooklyn, New York city, in the county of Kings and State of New York, have invented certain new and useful Improvements in Cord or Rope Holders, of which the following is a specification.

My invention relates to combined cord or rope holders and it is my object to produce a cheap, simple, strong holder in which the rope or cord can be pulled up taut as with a pulley, locked easily and securely, even if the body of the rope or cord is left loose, and from which the strain on the rope can be quickly and easily released.

In the drawing Fig. 1 is a face view of my improved device as made of cast metal; Fig. 2 a side view of the structure of Fig. 1; Fig. 3 a face view of the device as stamped from sheet metal; Fig. 4 a side view of the structure of Fig. 3 and Fig. 5 a sectional view of the structure of Fig. 3 on the line 5—5 thereof.

As shown in Figs. 1 and 2 the device consists of a cast plate having three holes, 2, 3 and 4, therein, a lower, upturned, lip 5 which terminates in an upwardly extending hook 6.

The hole 2 is at the top of the device, the hole 3 at the left hand end with its bottom substantially on the line of the inside of the groove formed by the lip 5 and the hole 4 is at the right hand end of the plate, but at the left of the hook 6 and well above the lip 5.

In the sheet metal form shown in Figs. 3, 4 and 5 the plate 1' is struck up from sheet metal with the holes 2', 3' and 4' spaced therein as they are in the cast form of Figs. 1 and 2 and has the upturned lip 5' and hook 6' struck up at its lower edge. To prevent chafing of the rope or cord the holes 2', 3' and 4' are lined with grommets or eyelets 7, 7, 7 as shown best in Fig. 5. A small lip 8 is formed beyond the bottom of the hook 6' to prevent chafing of the rope or cord as it is pulled through the hook 6'.

In use one end *a* of a rope or cord is passed through the upper hole 2 (or 2') and knotted to secure it to the device. The free end *b* is then passed "in" through the hole 4 (or 4') from front to rear, then "out" from rear to front through the hole 3 (or 3'), then under the free reach *c* of the rope or cord and along the lip groove in the direction of the arrow and under the hook 6 (or 6').

By pulling on the free end *b* of the rope or cord the slack in the reach *c* is taken up by sliding it through the holes 3 and 4 (or 3' and 4') just as would be the case of a pulley, but on releasing the strain on the free end *b* the strain on the reach *c* forces the part *d* into the lip groove while the hook 6 (or 6') holds the free end *b* securely in place.

To disengage the free end *b* is lifted over the hook and pulled downwards clear of the lip groove when it assumed the position shown in dotted lines in Fig. 1 and can slide freely through the holes 3 and 4 (or 3' and 4').

The device is light, cheap and simple to manipulate, being preferably marked as shown in the drawings to facilitate its use. It holds securely even if the rope or cord is not drawn taut due to the lip groove and tongue construction.

I claim:—

1. A cord or rope holder comprising a plate, an upturned lip on the lower edge of said plate and an upwardly projecting hook at one end of said lip, said plate being provided with three holes, the first of which is located at the upper part of the plate, the second of which is located at the end of the plate opposite the hook with its lower edge approximately in the line of the groove formed by the lip and plate and the third of which is located adjacent the hook and between it and the second hole with its bottom slightly above the bottom edge of the groove.

2. A cord or rope holder comprising a plate of sheet metal having an upturned lip on its lower edge and an upwardly projecting hook at one end of said lip, said plate being provided with three holes, the first of which is located at the upper part of the plate, the second of which is located at the end of the plate opposite the hook with its lower edge approximately in the line of the groove formed by the lip and plate and the third of which is located adjacent the hook and between it and the second hole with its bottom slightly above the bottom edge of the groove and an eyelet in each of said holes to prevent chafing.

3. A cord or rope holder comprising a sheet metal plate having an upturned lip on the lower edge thereof, an upwardly extending hook at one end of said lip and a downwardly extending small lip beyond the bottom of said hook, said plate being provided with three holes, the first of which is located at the upper part of the plate, the second of which is located at the end of the plate opposite the hook with its lower edge approximately in the line of the groove formed by the lip and plate and the third of which is located adjacent the hook and between it and the second hole with its bottom slightly above the bottom edge of the groove and an eyelet in each hole to prevent chafing.

In testimony whereof I have affixed my signature.

NILS SEAGREN.